Feb. 21, 1950     C. K. STEDMAN ET AL     2,498,306
CALIBRATION OF TELEMETERING EQUIPMENT
Filed Dec. 3, 1946
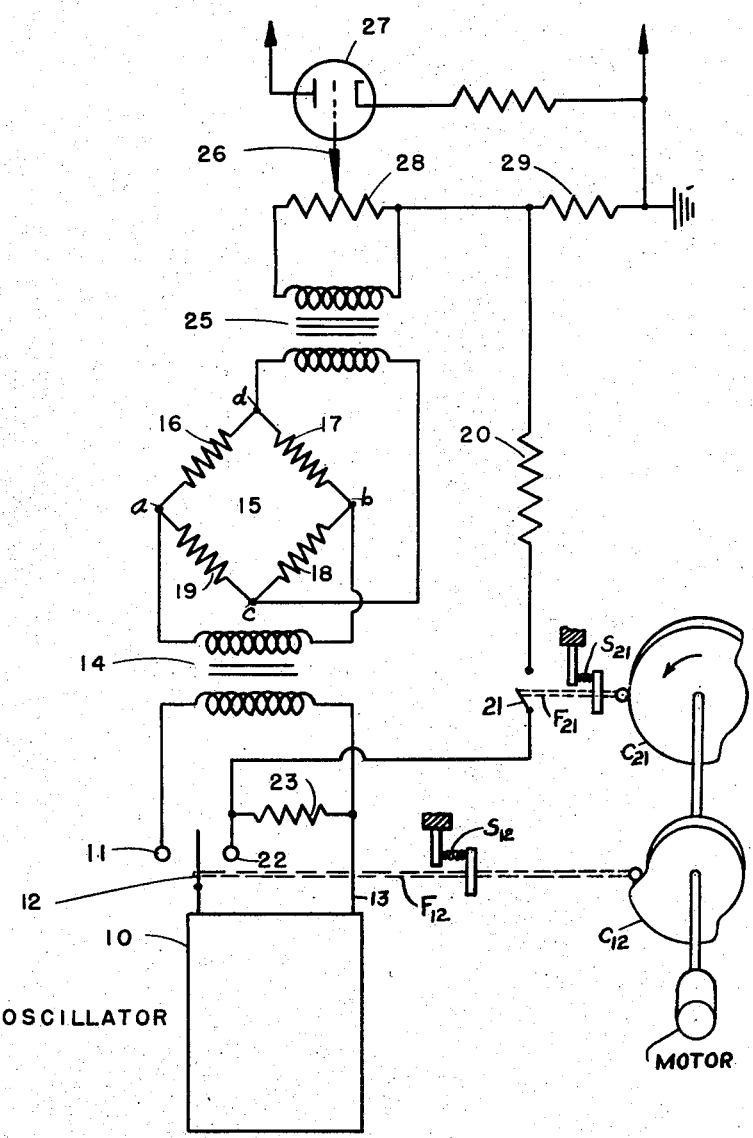
INVENTORS
CECIL K. STEDMAN
HARRY J. PRICE
ROBERT M WISNER
BY *Glenn Orlob*
AGENT Patented Feb. 21, 1950

2,498,306

UNITED STATES PATENT OFFICE 2,498,306

CALIBRATION OF TELEMETERING EQUIPMENT

Cecil K. Stedman, Harry J. Price, and Robert M. Wisner, Seattle, Wash., assignors to Boeing Airplane Company, a corporation of Delaware Application December 3, 1946, Serial No. 713,644

2 Claims. (Cl. 177—380)

This invention relates to a new and useful system for automatically checking the accuracy of telemetering equipment or the like at periodic intervals.

Telemetering equipment for transmitting flight test data from an airplane in the air to a radio receiving station located on the ground by means of a single complex radio wave must provide a large number of signal channels which record data simultaneously. In such systems it is highly desirable that a calibrating signal be applied periodically to each signal channel by the airborne transmitter so as to be recorded by the ground recording instruments along with the various flight test data obtained from pick-ups or other instruments located on the aircraft. It is also desirable that the telemetering calibration equipment be of such size as to be easily installed in a small fighter craft and that such equipment be light in weight.

Telemetering systems are known to the art which contain one or more oscillators supplying power to strain-sensitive strain gages, means to amplify the gage output signals, a radio transmitter, a radio receiver, means for isolating the separate gage signals, and means for recording data. However, a system of this type is not capable of very good accuracy because any change of oscillator power, any change of amplification anywhere in the system, or variation of attenuation within the transmission medium between the transmitter and receiver will cause a corresponding change in the calibration.

It is an object of this invention to provide a means for checking periodically the accuracy of telemetering equipment which is independent of any changes of amplification or of quiescent energy level or noise occurring in the amplifiers at the sending or receiving end or in the radio transmitter or receiver.

It is a further object of the instant invention to provide a system for calibrating telemetering equipment which is independent of any drift resulting from normal variations in oscillator voltage or from temperature changes.

It is a further object of this invention to provide a method of periodically calibrating the entire telemetric system including the transmission medium between the transmitter and receiver.

It is also an object of this invention to provide a means for automatically checking during flight the calibration of telemetering equipment which is light in weight and can be readily installed in small fighter aircraft.

Other objects, advantages and applications will become apparent to those versed in the art upon examination of the specifications, claims, and the drawing wherein the electrical relationship of the various components is shown in the preferred form of the invention.

Referring to the drawing for more specific details of the invention, an oscillator 10 as a source of electric energy normally applies power through contact 11 of the mechanically and preferably periodically operated single-pole double-throw switch 12 and the coupling transformer 14 to the Wheatstone bridge 15. The bridge 15 has two input terminals $a$ and $b$ connected to the secondary winding of the transformer 14, with adjacent output terminals $c$ and $d$ connected to the primary of the transformer 25. Bridge 15 which serves as a modulator of the energy from oscillator 10 is preferably in the form of three temperature compensated fixed resistors 16, 17, and 18 in series with a gage or resistive element pick-up 19, whose resistance changes in accordance with variations in strain, vibration, or any other information or performance variable for which a permanent record is desired. The secondary winding of the transformer 25 is coupled to the control grid 26 of a conventional preamplifier tube 27, preferably through a potentiometer 28, one terminal of which is connected to ground through resistor 29.

The high potential side of the resistor 29 is connected in series with a voltage drop resistor 20 and a single-pole single-contact switch 21, one contact of which is connected to contact 22 on switch 12. Connected between oscillator terminal 13 and the contact 22 is the dummy load resistor 23 which has the electrical characteristics required to maintain the output of oscillator 10 at substantially its normal value after switch 12 has been actuated by independent mechanical means to close the contact 22.

For the normal operation of this system, the switch 12 closes contact 11 and switch 21 is open. In this operating condition, the bridge 15 receives power from the oscillator 10, and the output signal of the bridge 15 is supplied to the amplifier tube 27, which modulates a conventional radio transmitter. To provide a periodic calibration signal and a zero-reference signal which may be recorded as a series of calibration and zero-reference lines or points by the telemetering receiving equipment, contact 22 is first closed by switch 12, thereby removing oscillator power from the bridge 15. At the same time the resistor 23 is connected across the oscillator 10 as part of a dummy load in order to prevent the output of the oscillator 10 from changing materially as a result of reduced load. During this period the amplifier is impressed with no input voltage, resulting in a zero-reference output signal. After the lapse of a predetermined time interval such as ½ second, the switch 21 is automatically closed, preferably by the same mechanism periodically operating switch 12, thereby impressing a calibration or reference voltage on the grid 26 of the preamplifier tube 27 through the voltage divider resistors 20 and 29 which complete the dummy load circuit serving to present a load to the oscillator matching that presented by the bridge circuit normally connected thereto through switch contact 11. During this second interval a calibration signal is transmitted. After this second time interval of approximately ½ second, switch 21 is automatically opened and switch 12 is actuated to close contact 11 to restore normal operation and transmit the measured-quantity signal. The operation is repeated in that or any order periodically to provide a substantially continuous flow of data over the transmission channel.

Automatic periodic actuation of switches 12 and 21 according to the foregoing sequence is accomplished by any suitable mechanism such as the motor driven rotary cam arrangement illustrated in the figure. Cams $C_{12}$ and $C_{21}$ driven synchronously respectively actuate the switches 12 and 21 by means of cam follower means generally designated $F_{12}$ and $F_{21}$. As shown, further, the high and low regions of the respective cam peripheries are of such arcuate lengths and so phased as between cams as to execute the switching sequence described, the cams $C_{12}$ and $C_{21}$ cooperating respectively with return spring means $S_{12}$ and $S_{21}$ urging the cam followers into steady contact with the cam peripheries. This type of mechanism for actuating switches in sequence is conventional.

All calibrations of the record received on the ground are expressed in terms of the ratio between voltage derived from the bridge 15 and the calibration or reference voltage supplied directly from the oscillator 10 to the preamplifier tube 27. Any change in the output voltage of the oscillator 10 due to temperature changes, normal variations in power supply voltage, or other causes will change the reference voltage and the bridge output voltage in the same proportion so that the ratio of the two will remain unchanged. The same is true of any changes of amplification occurring in the amplifiers at the sending or receiving end, or in the radio transmitter or receiver. Any changes in quiescent energy or output level of transmitter or receiver will be accounted for or recorded by the zero-reference signal transmitted intermittently with the measured-quantity and calibration signals. This is a feature of importance to the accuracy of the system. Spurious or noise signals generated in or passing through the receiver are one source of variation in the quiescent energy or output level of the receiver affecting the readings of the calibration and measured-quantity recorded signals, and are accurately accounted for by frequently automatically producing and recording the zero-reference signal as described. If this were not done it would be difficult if not impossible to ascertain in the record the effect of noise on the ratio of the calibration and measured-quantity signals. It is to be noted that the zero-reference signal is produced simply by applying no modulation to the radio transmitter for a short period between calibration and measured-quantity signals. The only circuit conditions which can change the calibration is a variation in the values of the resistors 20, 23 and 29, and these components may be of a stable wire wound or equivalent type having a resistance which is substantially constant for all conditions of operation.

Telemetering equipment incorporating the calibration system disclosed herein has been successfully tested and it has been found that errors in the telemeter itself have been almost completely eliminated, so that the only errors remaining are either inherent in the bridge gages or result from the reading error of the recording equipment.

For purposes of explaining the instant invention a particular embodiment thereof has been described in detail. It is understood, however, that the principles of the subject invention can be applied to telemetering systems employing widely differing components between the gage elements in the airplane and the recording equipment on the ground. Obviously this method of insuring accuracy in a telemetric system is not limited to use involving radio transmission but may be also used for example on wire line transmission systems involving only direct current. In addition, the type of gage elements is inconsequential since they are rendered inoperative during the calibrating cycle. Although only one channel has been shown for simplicity in the drawing, those versed in the art will immediately realize that these same principles disclosed herein may be applied for calibrating a telemetering system wherein the output of one oscillator is consecutively and sequentially modulated by a plurality of independent modulators by means of appropriate commutating equipment thus providing a multiplicity of information channels. Expanding its use still further, this calibration system may obviously be used in a system involving a plurality of oscillators each serving a single modulator or a plurality of modulators as cited above involving commutating means. This last mentioned system is similar to one designed by the inventors and in actual use for telemetering conditions during the test flight of an airplane to receiving equipment on the ground.

It is also understood that many changes can be made in the particular construction described without departing from the principles of this invention, and we do not intend to be limited to the circuit arrangement shown except as such limitations are clearly imposed by the appended claims.

We claim:

1. A telemetering circuit comprising an oscillator, telemetering transmitter electronic amplifier means having an input and operable to amplify the output of said oscillator, and selective transfer circuit means interposed between said oscillator and said amplifier and operable to transfer the output of said oscillator to the input of said amplifier means, said selective transfer circuit means including alternate parallel branches, one such branch comprising modulator means normally connected between the output of said oscillator and the input of said amplifier means to present a normal load to said oscillator and to transfer and modulate the oscillator output for application to said amplifier means, and the other branch comprising an alternative transfer circuit including dummy load resistance calibration means, alternatively connected between the output of said oscillator and the input of said amplifier means to present a load to said oscillator substantially matching said normal load and to transfer the output of said oscillator to said amplifier means as a calibration signal, and switching means having effectively two alternate switching positions for selecting either of the respective alternate transfer circuit branches, and a neutral third position in which neither of such branches is interconnected operatively between the oscillator and amplifier means, and switch-actuating means operable to actuate said switch means to change its position from one of its three positions to another and then to the third intermittently and in a selected order, and each for a predetermined period of time, to transmit a modulation signal, a calibration signal and a zero-reference signal in the respective period.

2. A telemetering circuit comprising an oscillator, telemetering transmitter electronic amplifier means having an input and operable to amplify the output of said oscillator, and selective transfer circuit means interposed between said oscillator and said amplifier and operable to transfer the output of said oscillator to the input of said amplifier means, said selective transfer circuit means including alternate parallel branches, one such branch comprising modulator means normally connected between the output of said oscillator and the input of said amplifier means to present a normal load to said oscillator and to transfer and modulate the oscillator output for application to said amplifier means, and the other branch comprising an alternative transfer circuit including calibration circuit means, alternatively connected between the output of said oscillator and the input of said amplifier means to transfer the output of said oscillator to said amplifier means as a calibration signal, and switching means having effectively two alternate switching positions for selecting either of the respective alternate transfer circuit branches, and a neutral third position in which neither of such branches is interconnected operatively between the oscillator and amplifier means, and switch-actuating means operable to actuate said switch means to change its position from one of its three positions to another and then to the third intermittently and in a selected order, and each for a predetermined period of time, to transmit a modulation signal, a calibration signal and a zero-reference signal in the respective periods.

CECIL K. STEDMAN.
HARRY J. PRICE.
ROBERT M. WISNER.

REFERENCES CITED

The following references are of record in the file of this patent:

UNITED STATES PATENTS

| Number | Name | Date |
|---|---|---|
| 1,929,241 | Franklin | Oct. 3, 1933 |
| 2,287,786 | Diamond | June 30, 1942 |
| 2,323,317 | Dunmore | July 6, 1943 |
| 2,378,395 | Dickson | June 19, 1945 |
| 2,379,996 | Silverman | July 10, 1945 |
| 2,418,836 | Hawes | Apr. 15, 1947 |

FOREIGN PATENTS

| Number | Country | Date |
|---|---|---|
| 275,741 | Great Britain | Aug. 18, 1927 |